United States Patent
Tuxen

(10) Patent No.: US 11,612,801 B2
(45) Date of Patent: *Mar. 28, 2023

(54) SYSTEM AND METHOD FOR DETERMINING IMPACT CHARACTERISTICS OF SPORTS BALL STRIKING ELEMENT

(71) Applicant: TRACKMAN A/S, Vedbaek (DK)

(72) Inventor: Fredrik Tuxen, Rungsted Kyst (DK)

(73) Assignee: TRACKMAN A/S, Vedbaek (DK)

( * ) Notice: Subject to any disclaimer, the term of this patent is extended or adjusted under 35 U.S.C. 154(b) by 96 days.

This patent is subject to a terminal disclaimer.

(21) Appl. No.: 17/249,062

(22) Filed: Feb. 18, 2021

(65) Prior Publication Data

US 2021/0170257 A1    Jun. 10, 2021

Related U.S. Application Data

(63) Continuation of application No. 17/247,431, filed on Dec. 10, 2020, now Pat. No. 11,439,886, which is a
(Continued)

(51) Int. Cl.
*A63B 71/06* (2006.01)
*G06T 7/246* (2017.01)
(Continued)

(52) U.S. Cl.
CPC .......... *A63B 71/06* (2013.01); *A63B 24/0062* (2013.01); *A63B 69/36* (2013.01);
(Continued)

(58) Field of Classification Search
CPC ..... A63B 71/06; A63B 24/0062; A63B 69/36; A63B 24/0003; A63B 2024/0031;
(Continued)

(56) References Cited

U.S. PATENT DOCUMENTS

2011/0286632 A1    11/2011    Tuxen et al.
2021/0113908 A1*    4/2021    Tuxen .................. G06T 7/73

FOREIGN PATENT DOCUMENTS

JP          312179          1/1991
JP     2005-270508        10/2005
(Continued)

*Primary Examiner* — Diane D Mizrahi
(74) *Attorney, Agent, or Firm* — Fay Kaplun & Marcin, LLP

(57) ABSTRACT

A method includes identifying a first point on an object striking element in a first image and a second image from images. The first and second images are captured within a predetermined time span of an impact of the object with the element and determining an impact time of the impact in combination with determining a position in the first and/or second images corresponding to a location of the object at the impact time. Based on the positions of the first point in the first and second images, determining a position in the first and/or second images corresponding to a position of the first point at the impact time. The method also includes determining a distance from the imager to a location at which the object and the element impact one another and determining an impact location of the object relative to the first point.

20 Claims, 12 Drawing Sheets

Related U.S. Application Data continuation of application No. 16/224,161, filed on Dec. 18, 2018, now Pat. No. 10,953,303.

(60) Provisional application No. 62/609,867, filed on Dec. 22, 2017.

(51) Int. Cl.
*A63B 24/00* (2006.01)
*G06T 7/73* (2017.01)
*A63B 69/36* (2006.01)

(52) U.S. Cl.
CPC .............. *G06T 7/246* (2017.01); *G06T 7/248* (2017.01); *G06T 7/73* (2017.01); *A63B 24/0003* (2013.01); *A63B 2024/0031* (2013.01); *A63B 2220/806* (2013.01); *A63B 2220/89* (2013.01); *G06T 2207/30224* (2013.01)

(58) Field of Classification Search
CPC .......... A63B 2220/806; A63B 2220/89; G06T 7/246; G06T 7/248; G06T 7/73; G06T 2207/30224
See application file for complete search history.

(56) References Cited

FOREIGN PATENT DOCUMENTS

| | | |
|---|---|---|
| JP | 2011-183090 | 9/2011 |
| JP | 2015-139532 | 8/2015 |
| JP | 2017-50798 A | 3/2017 |

* cited by examiner

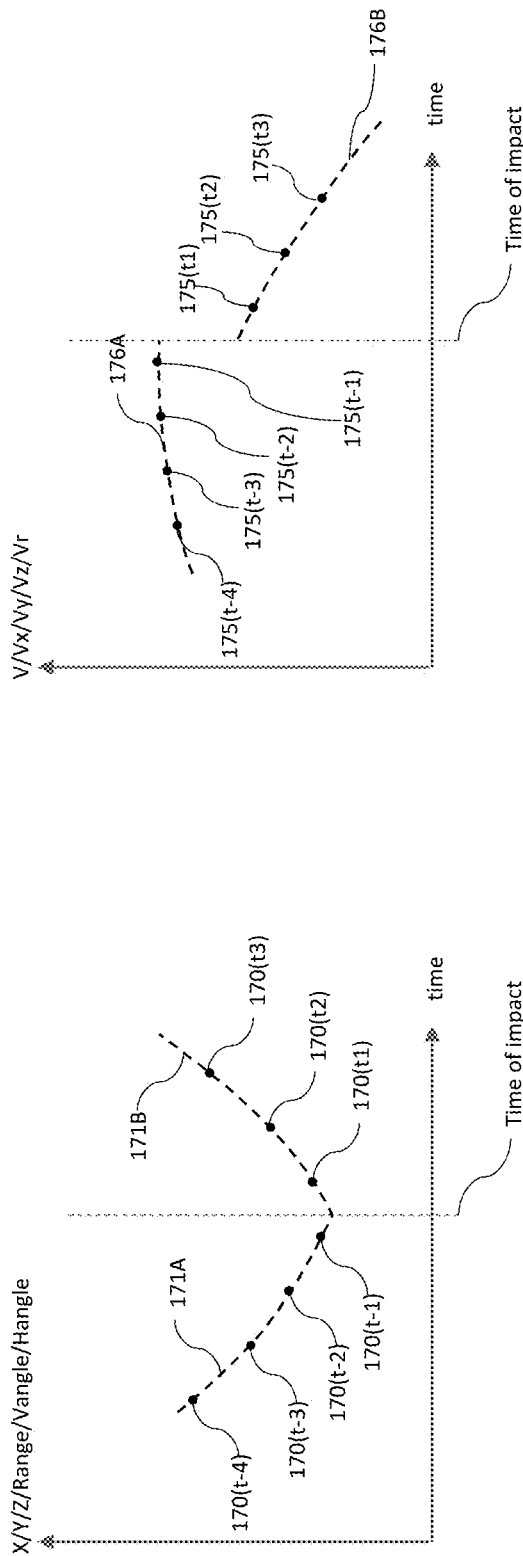

Frame time: -6.0 ms

Frame time: -12.0 ms

Frame time: 6.0 ms

Frame time: 0.0 ms

Frame time: 18.0 ms

Frame time: 12.0 ms

SYSTEM AND METHOD FOR DETERMINING IMPACT CHARACTERISTICS OF SPORTS BALL STRIKING ELEMENT

PRIORITY CLAIM

The present application is a Continuation of U.S. patent application Ser. No. 17/247,431 filed on Dec. 10, 2020; which is a Continuation of U.S. patent application Ser. No. 16/224,161 filed on Dec. 18, 2018; which claims priority to U.S. Provisional Patent Application Ser. No. 62/609,867 filed Dec. 22, 2017. The entire disclosure of these patent(s)/application(s) is expressly incorporated herewith by reference.

BACKGROUND

Impact characteristics of a struck object may have a significant influence on the flight of the object. For example, the position at which a golf ball impacts a face of a golf club may significantly affect the outcome of a golf shot. As such, information about the impact characteristics of the golf shot are valuable for golfers, golf instructors, club fitters, etc. Other impact characteristics may include a three-dimensional direction described by the path of the golf club up to the point of impact with the ball, including an attack angle of the golf club, and a three-dimensional orientation of the golf club just prior to impact with the ball, including characteristics such as a face angle of the club face, dynamic loft and dynamic lie. Prior technology for determining impact characteristics such as U.S. Pat. No. 8,951,138, requires visual observation of the impact between the club and the ball using multiple cameras facing the club face at the time of impact using stereo-vision techniques to extract the impact characteristics. However, as the cameras for such systems must be in front of the golfer (i.e., in the path of oncoming golf shots) exposes the cameras to the risk of being hit by struck balls. In addition, the system of U.S. Pat. No. 8,951,138 requires the accurate placement of reflective markers on the club face, which is a time-consuming and difficult process and may interfere with the normal flow of the golfer when hitting golf balls, and further the multiple cameras required increases the complexity and cost of the system.

SUMMARY

The present invention relates to a system that uses a novel method for determining impact characteristics of an object striking element, such as a sports ball striking element. The system may include a single imager. The imager may operate in the visual or non-visual wavelength region and may operate with a known frame rate of typically 150 to 4000 fps. The imager may be part of a special purpose apparatus or may be a camera from a smartphone or similar.

In another embodiment, the system may further include an additional sensor, such as another imager, a radar, or a microphone, to improve the accuracy of the impact characteristic determination.

Several embodiments described herein do not require any special marking of the ball striking element or the ball and instead identify generic fix points on individual ball striking elements such as the hosel or toe of a golf club, the tip or knob of a baseball or cricket bat, the tip or head of a tennis, badminton, squash or other racket, or the heel and/or toe of football boots. The fix points are selected on the criteria of being clearly identifiable in images as seen from a broad range of view angles of the imager to a location at which a ball is to be struck and/or a broad range of angles during the motion of the ball striking element. Fix lines may be, for example, the shaft of a golf club, hockey stick or racket. Another example of a fix line is the center line of a baseball or cricket bat on which the handle is positioned. Fix lines will generally be straight lines, however, due to the angular acceleration of the ball striking element during a swing, these fix lines may experience a slightly curved shape around the time of impact, where the player will generally try to accelerate the speed of the part of the ball striking element that is intended to collide with the ball.

The fix points are also selected such that they may be either directly or easily transferred into a user-friendly coordinate system of the ball striking element, such as the center of the club face on a golf club. Such a transformation from, e.g., the hosel of the golf club to the center of the club face, will generally encompass both a translation and a rotation. The parameters needed for the transformation may either be predetermined or determined through fix point and fix line tracking, optionally combined with assumptions, such as that the club face center is in the middle of the face between the toe and the heel of the golf club, etc.

A method according to an embodiment disclosed includes identifying a first point on the object striking element in a first image and a second image from a sequence of images, wherein the first and second images are captured within a predetermined time span of an impact of the object with the object striking element and determining an impact time of the impact of the object with the object striking element in combination with determining a position in at least one of the first and second images corresponding to a location of the object at the impact time and, based on the positions of the first point in the first and second images, determining a position in at least one of the first and second images corresponding to a position of the first point at the impact time. The method also includes determining a distance from the imager to a location at which the object and the object striking element impact one another and determining an impact location of the object relative to the first point.

A method according to a further embodiment may include identifying a first point on the object striking element in a first image and a second image from a sequence of images, wherein the first and second images are captured within a predetermined time span of an impact of the object with the object striking element and determining an impact time of the impact of the object with the object striking element and determining a rate of change of a distance from the imager to the object striking element during the predetermined time span. The method also includes determining a distance from the imager to a location at which the object and the object striking element impact one another and determining a three-dimensional direction of movement of the object striking element during the predetermined time span.

A method according to a still further embodiment of the invention may include identifying a first line on the object striking element in at least a first image and a second image from a sequence of images, wherein the first and second images are captured within a predetermined time span of an impact of the object with the object striking element and determining an impact time of the impact of the object with the object striking element in combination with determining an angle of the line at the impact time.

BRIEF DESCRIPTION

FIG. 8A shows position, distance or angle components of a ball striking element over time according to an exemplary embodiment of the present invention.

FIG. 8B shows velocity components of a ball striking element over time according to an exemplary embodiment of the present invention.

FIGS. 10-1 through 10-6 show a sequence of images of a golf club impacting a golf ball according to an exemplary embodiment of the present invention.

DETAILED DESCRIPTION

Figure 1:
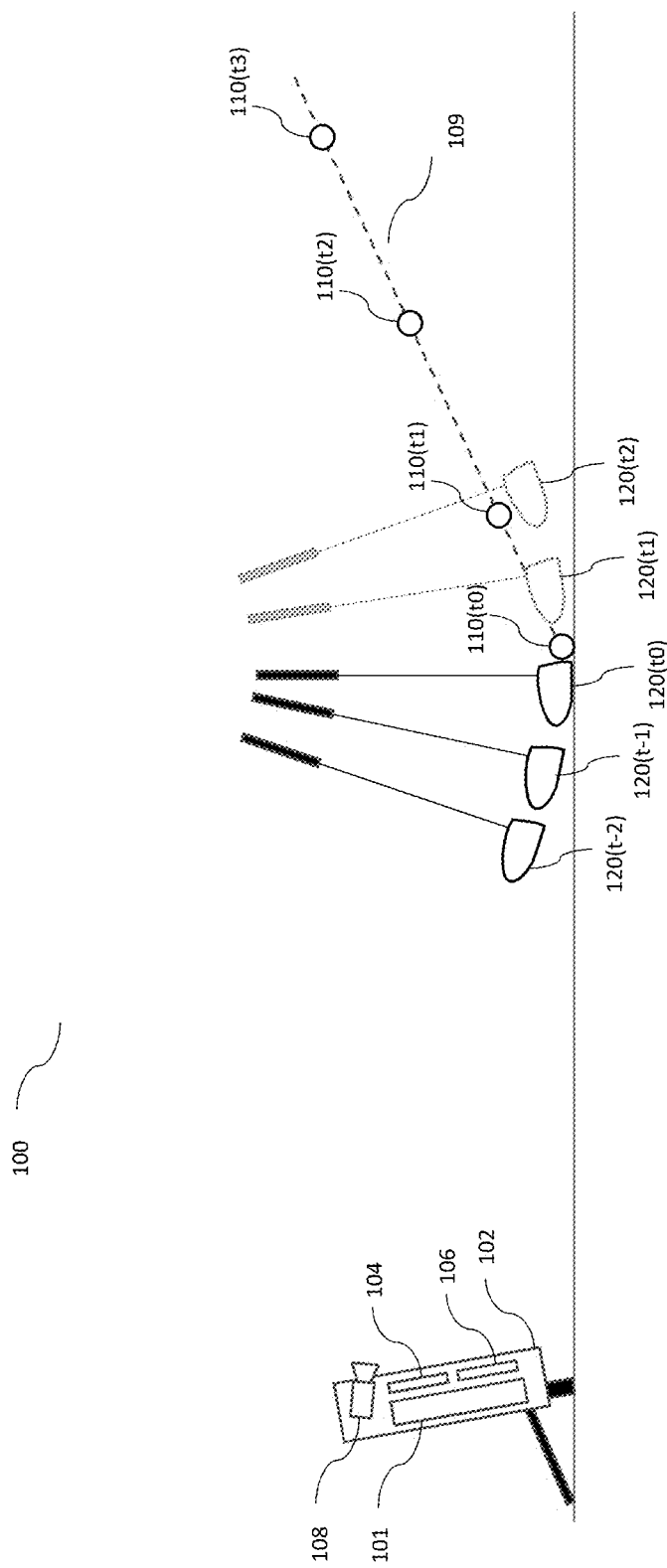
FIG. 1 shows a system for determining impact characteristics of a golf club impacting a golf ball according to an exemplary embodiment of the present invention.

The exemplary embodiments may be further understood with reference to the following description and the related appended drawings, wherein like elements are provided with the same reference numerals. The exemplary embodiments relate to a system and method for determining the impact characteristics of a struck object and an object striking element, specifically a struck sports ball and a ball striking element, for example, identifying: a location on the ball striking element at which the element contacts the sports ball; a three dimensional path of the sports ball striking element immediately prior to and through the impact with the sports ball; a path of the ball immediately prior to and through the impact with the sports ball striking element, etc. In certain applications such as golf, the sports ball may be stationary before it is impacted with the ball striking element while in others such as baseball, the ball will be moving prior to impact with the bat. Although various exemplary embodiments detailed herein describe the tracking of a golf club and golf balls, those skilled in the art will understand that any sports ball and sports ball striking element, or even non-sports related objects, may be tracked with the system in the same manner.

Figure 6:
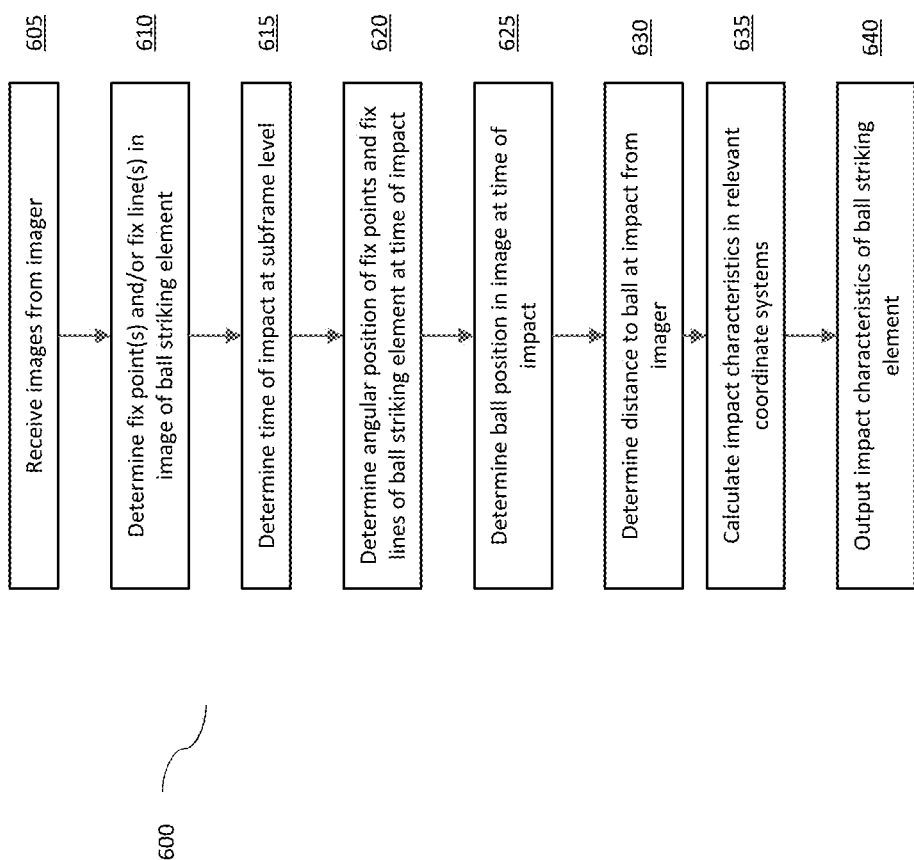
FIG. 6 shows a flow chart of the steps needed in one of the embodiments of the current invention.
Figures 2, 10:
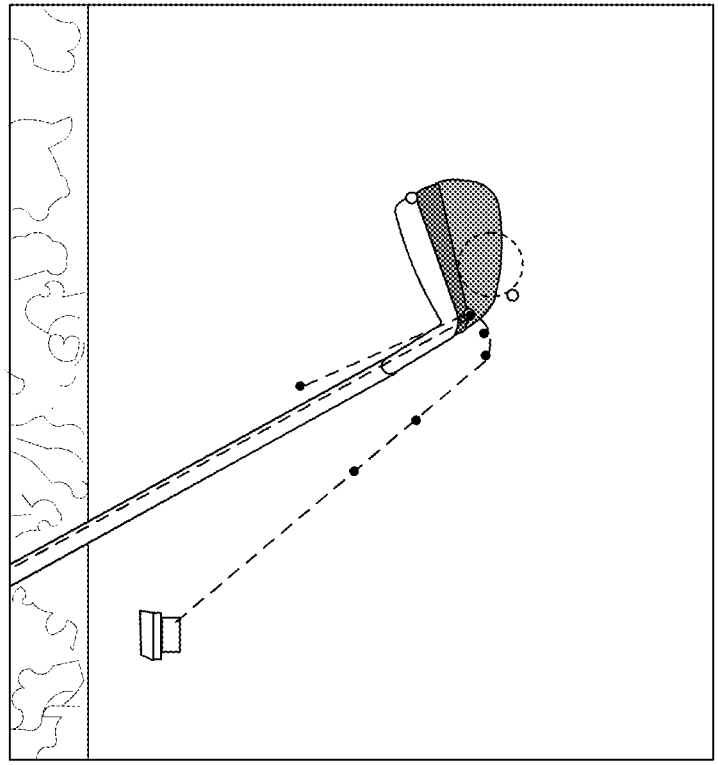
Figures 1, 10:
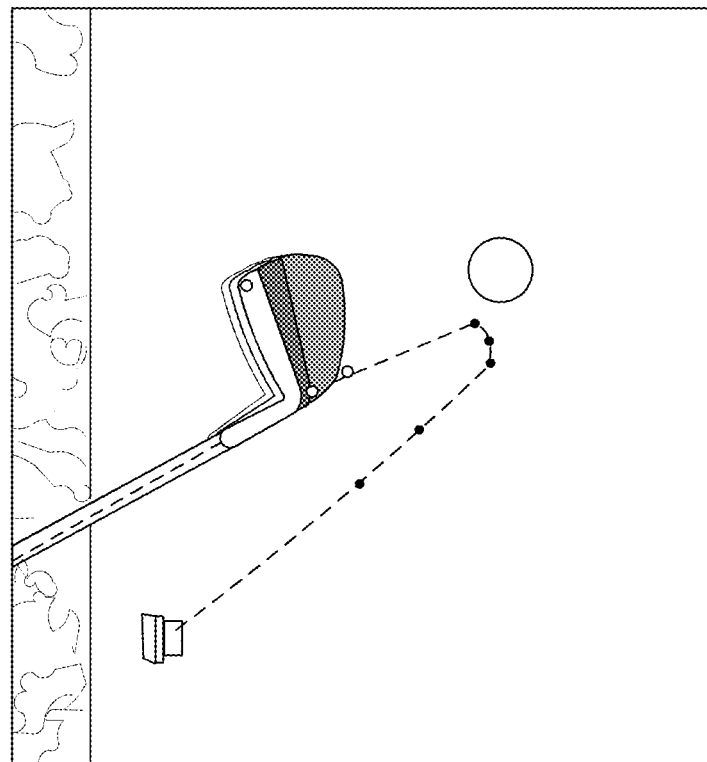
Figures 4, 10:
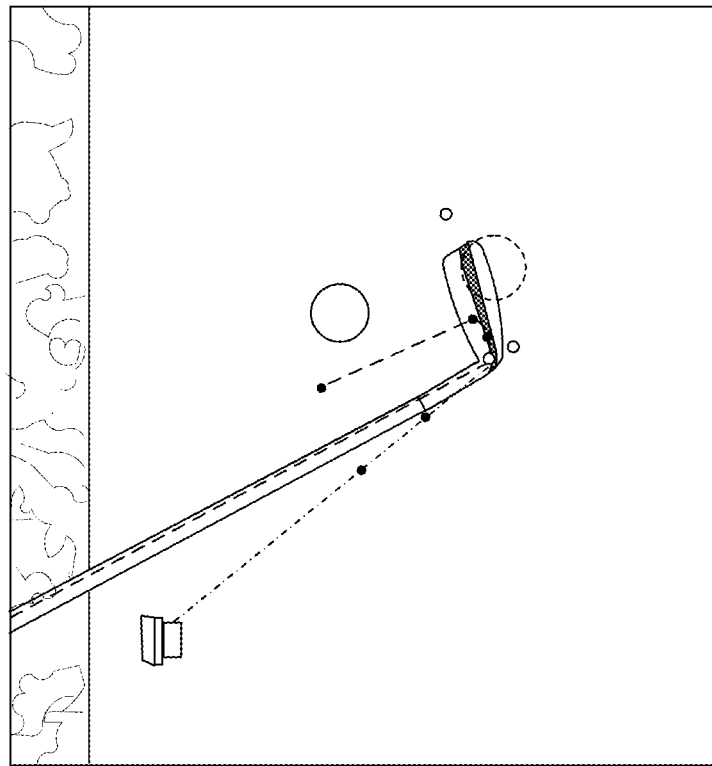
Figures 3, 10:
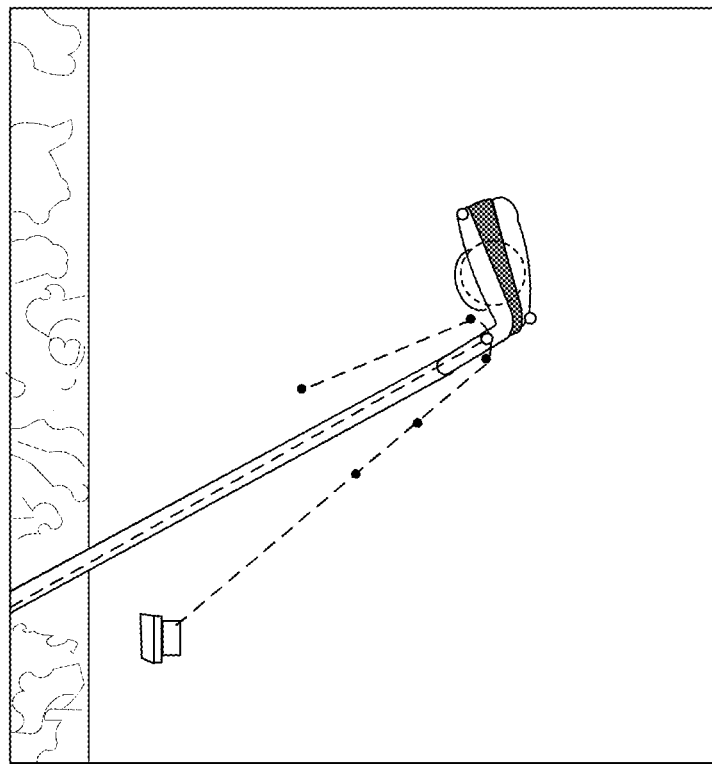
Figures 6, 10:
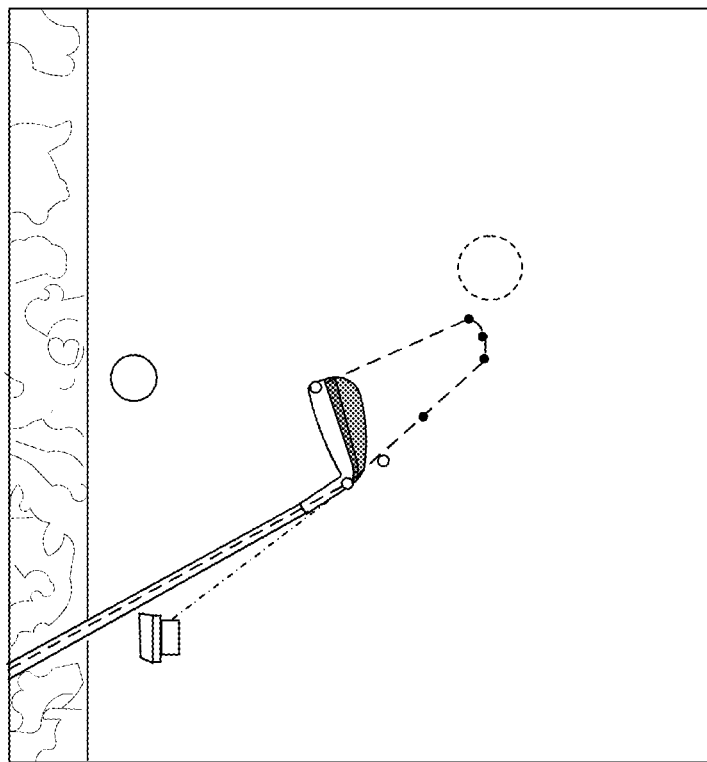
Figures 5, 10:
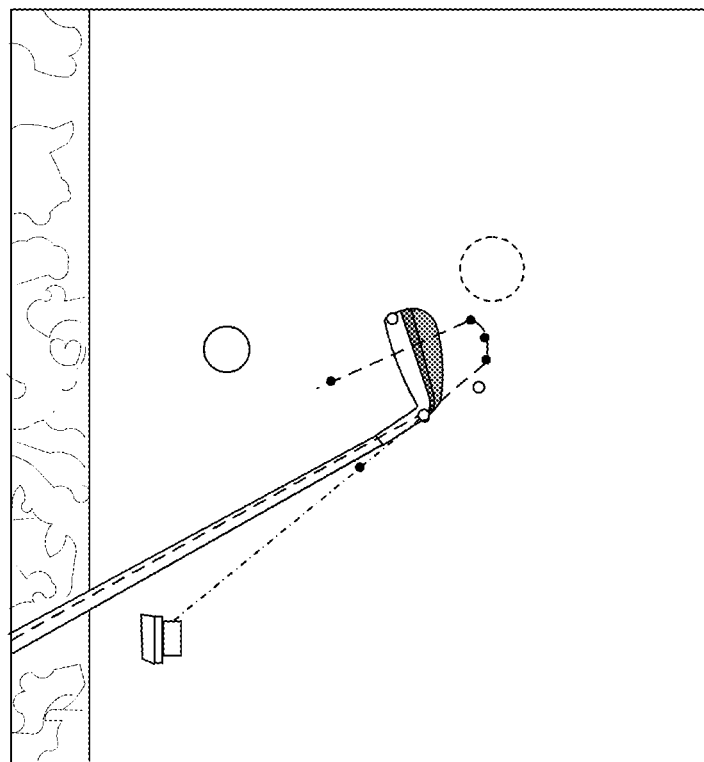

FIG. 1 shows a system 100 according to an exemplary embodiment for determining impact characteristics of a golf club 120 impacting a golf ball 110. The system 100 includes an apparatus 102 comprising an imager 108 with a field of view (FoV) covering an impact area, i.e., an area encompassing the location at which an impact between the golf club 120 and the golf ball 110 is expected to occur. The imager 108 captures a sequence of images at various times during the execution of the golf shot. The images are referred to herein as frames. The sequence of images may include multiple frames showing the positions of the golf club 120 and the golf ball 110. For example, at time (t-2), the golf club 120 has a position 120(t-2) and the golf ball 110 has a position 110(t-2). Similarly, at time (t-1), the golf club 120 has a position 120(t-1) and the golf ball has a position 110(t-1). Time (t0) is the time of impact. In the present embodiment, the positions of the golf ball prior to impact, i.e., 110(t-2), 110(t-1) and the position of the golf ball at impact, i.e., 110(10), are identical. However, in further embodiments, the object may be moving prior to impact. The exemplary embodiments do not require that the precise moment of impact (t0) be captured in a frame. The span of time between successive frames, e.g., between the captured frame at (t-2) and the captured frame at (t-1), correlates with the frame rate of the imager 108. Any imager 108 may be used that has a frame rate sufficiently high to capture multiple frames of a golf swing before and after impact. For example, FIGS. 10-1 through 10-6 show a sequence of images of a golf club impacting a golf ball according to an exemplary embodiment of the present invention. Six successive frames are shown of a golf shot at time increments of 6 ms, correlating to a frame rate of 167 fps.

The apparatus 102 further comprises a processing arrangement 101 including a processor and a computer-readable memory. The processing arrangement 101 may optionally include a transceiver for sending and receiving data and a display for displaying impact characteristics. The memory may store computer-readable instructions for execution by the processor. The memory may further store geometric models or reference images of specific golf clubs or golf club types (driver, 3 wood, 4 iron, 5 iron, etc.) and locations of fix points and fix lines relative to a club coordinate system, as well as geometric models or reference images of golf balls. In further embodiments, the memory may store geometric models or reference images of one or more further object striking elements (bats, rackets, etc.) and locations of fix points and fix lines relative to the object coordinate system, as well as geometric models or reference images of corresponding objects (baseballs, tennis balls). The processing arrangement is shown in FIG. 1 as an integral part of the apparatus 102, however, the processing arrangement 101 may not be an integral part of the apparatus 102 and may instead be a computer connected to the imager 108 via a suitable wired or wireless interface. Optionally, the apparatus 102 may include a radar transmitter 104 and one or more radar receivers 106. The radar may be used to increase the accuracy and robustness of the overall system, as will be described in further detail below. The apparatus 102 may also include a microphone (not shown in FIG. 1) and/or other sensors, such as one or more additional imagers. The additional imagers may be used together with the imager 108 to increase the reliability of the system 100 by operating at different imager settings or by using wavelengths other than those used by imager 108. The images captured by additional imagers may also be processed using stereo vision techniques to identify and track the fix points and the fix lines. In a preferred embodiment, the apparatus 102 is placed behind an intended target line for the struck golf ball 110, ensuring that both the golf club movement and the ball path 109 will appear in the FoV of the imager as much as possible, while at the same time ensuring that the apparatus 102 is not at risk of being impacted by an off-target golf shot. Other locations of the apparatus 102 may also be used. Indeed, any location for the apparatus 102 may be used, so long as a sufficient number of frames depicting the golf club 120 and the movement of the golf ball 110 are captured around the time of impact of the golf club 120 and the golf ball 110.

Figure 2:
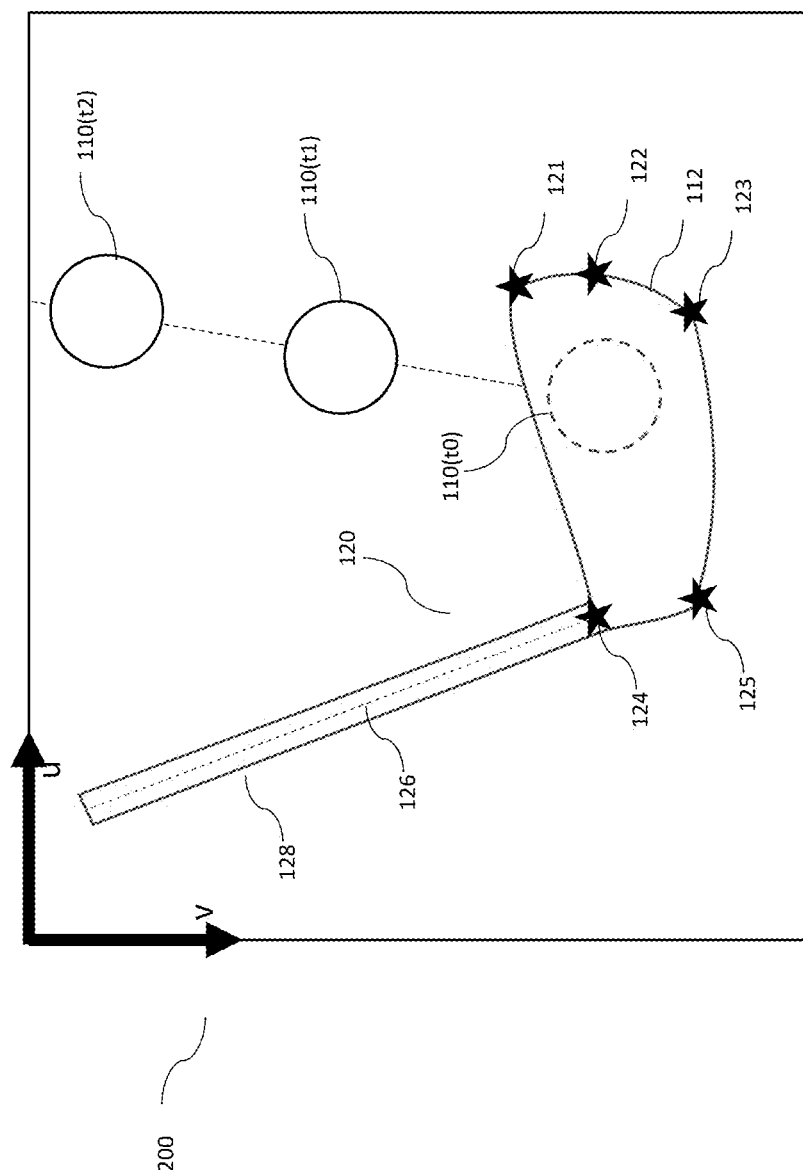
FIG. 2 shows a first rear view of a golf club impacting a golf ball according to an exemplary embodiment of the present invention.

FIG. 2 shows a rear view of a golf club 120 impacting a golf ball 110 according to an exemplary embodiment of the present invention. The depicted rear view may be an image from the imager 108. It will be understood that the imager 108 may capture a sequence of images including images prior to impact and after impact. In a preferred embodiment, a fix line 126 of the ball striking element may be identified as, for example, the center line of a bottom portion of a shaft 128 of the golf club 120 as shown in FIG. 2. However, the fix line identified may vary depending on the shape of the ball striking element. In addition to the fix line, various fix points 121-125 on the head 112 of the golf club 120 are identified in each image of the sequence of images in which the fix points 121-125 are visible. Not all fix points 121-125 may be clearly visible in each of the images. For example, the bottom of the club head 112 may be covered by grass, as seen from the imager 108, which would make the detection of fix points 122, 123 and 125 difficult. A location of the golf ball 110 is also determined in at least a portion of the sequence of images. The location of the golf ball 110 is determined in at least one image before impact, e.g. at time t-1, and in at least one image after impact, e.g. at time t1. The location of the golf ball 110 at the time of impact, t0, is shown in FIG. 2 as 110(*t0*), as well as at points in time after impact t1, t2 as 110(*t1*) and 110(*t2*).

Figure 3:
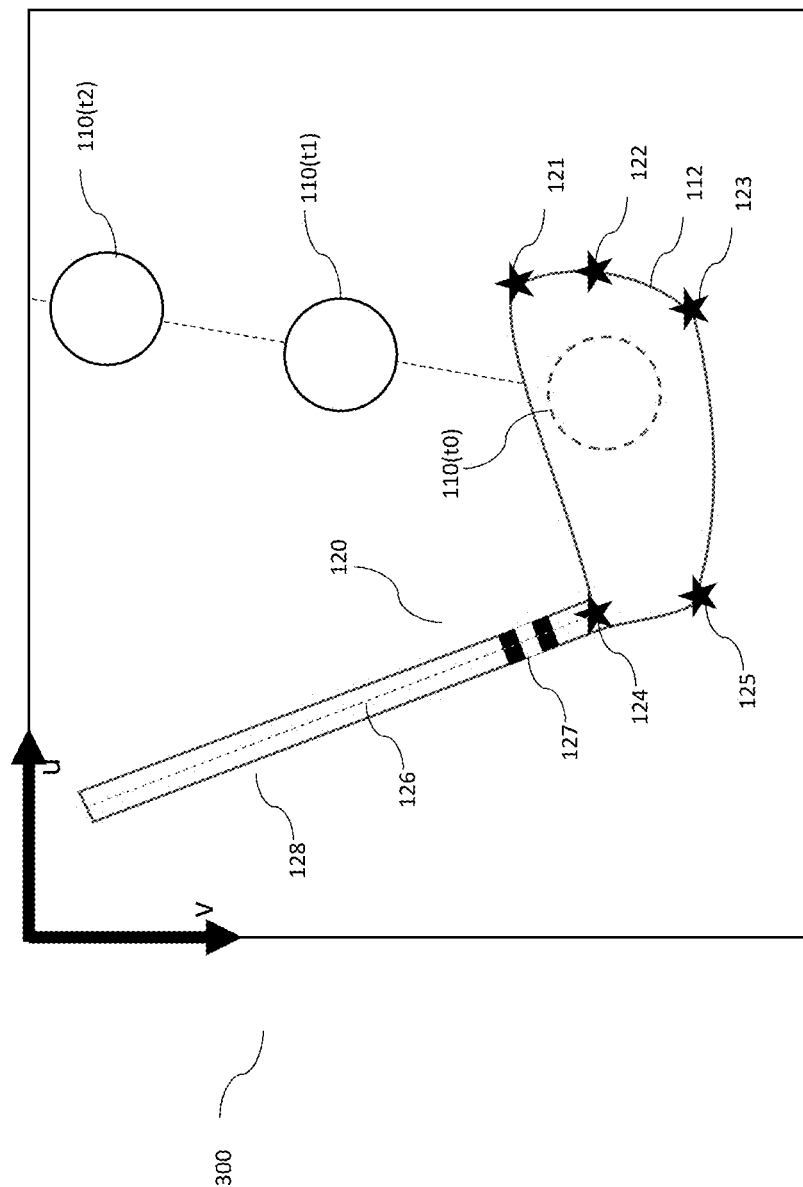
FIG. 3 shows a second rear view of a golf club impacting a golf ball according to an exemplary embodiment of the present invention.

FIG. 3 shows a second rear view 300 of a golf club 120 impacting a golf ball 110 according to an exemplary embodiment of the present invention. In FIG. 3, a marker 127 has been placed on the golf shaft. The optional marker 127 may be employed to facilitate the detection of this point in each or an increased number of frames of the sequence of frames. The marker 127 may be used to check the accuracy of the determination of any of the other fix points 121-125 or the fix line 126, as will be explained in further detail below with respect to FIG. 6.

Figure 4:
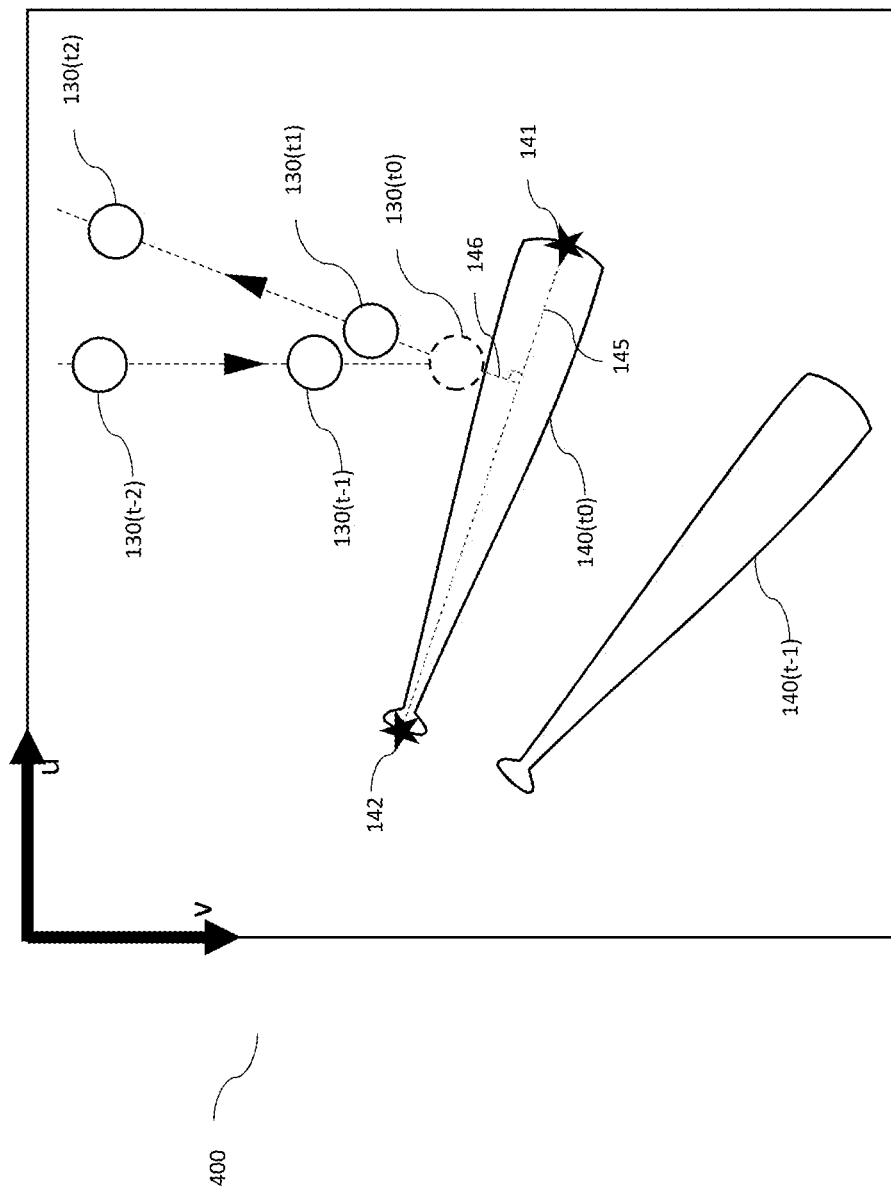
FIG. 4 shows a view of a baseball bat impacting a baseball according to an exemplary embodiment of the present invention.

FIG. 4 shows a view 400 of a baseball bat 140 impacting a baseball 130 according to an exemplary embodiment of the present invention. The depicted view may be an image from the imager 108. Similar to the embodiments described in FIGS. 2-3, a fix line of the baseball bat 140 may be identified to measure impact characteristics of a baseball swing. In contrast to the golf club in the example above, the fix line 145 of the baseball bat 140 may be selected as a center line of the baseball bat—i.e., a longitudinal axis of the bat 140. Baseball bats generally have a rotationally symmetric shape, so even without knowing the specific bat type or model it is in general relatively easy to identify the longitude axis of the bat. The fix points of the baseball bat 140 may, for example, be a tip 141 of the bat farthest from the handle and a knob 142 at the handle of the bat. These fix points may be employed to reliably determine the bat position in the images at multiple times, e.g., 140(*t-1*), 140(*t0*), etc. In a similar manner, the baseball 130 is detected at times both before impact, e.g., 130(*t-2*), 130(*t-1*), and after impact, e.g., 130(*t1*), 130(*t2*). Although, the ball position at the time of impact, 130(10), may not be not shown precisely in an image, or it may be occluded by the baseball bat or a player swinging the baseball bat, by using ball detections both before and after impact, the ball position at impact, 130(*t0*), may be determined.

Figure 5:
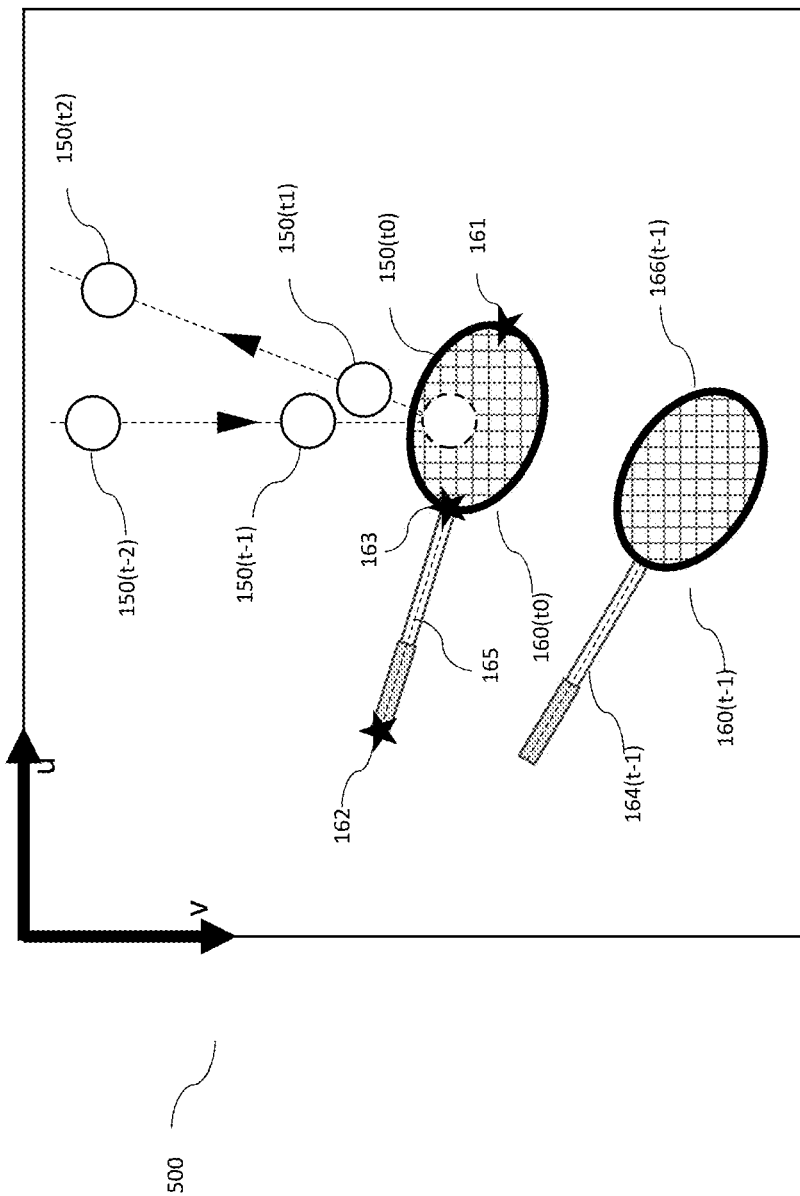
FIG. 5 shows a view of a tennis racket impacting a tennis ball according to an exemplary embodiment of the present invention.

FIG. 5 shows a view 500 of a tennis racket 160 impacting a tennis ball 150 according to an exemplary embodiment of the present invention. The depicted view may be an image from the imager 108. Similar to the embodiments described in FIGS. 2-4, a fix line of the tennis racket 160 may be determined in order to measure impact characteristics of a tennis racket swing. However, the fix line 165 of the tennis racket 160 may be the center line of the tennis racket shaft 164 and handle. The fix points of the tennis racket 160 may be a bottom 162 of the handle of the racket, a throat 163 at the intersection of the handle and the head of the racket, and a tip 161 of the head 166 of the racket. In addition, a whole or part of a frame of the racket head 166 may be determined. Using one or more of these fix points and lines, the apparatus 102 is able to reliably determine the racket position in the image at multiple times, e.g., 160(*t-1*), 160(*t0*). In a similar manner, the tennis ball 150 may be detected at times both before impact, e.g., 150(*t-2*), 150(*t-1*), and after impact, e.g., 150(*t1*), 150(*t2*). The ball position at impact, 150(*t0*), may not be available in an image, or it may be occluded by the tennis racket or a tennis player. However, by using ball detections both before and after impact and interpolating between these positions, the ball position at impact, 150(*t0*), may be determined.

FIG. 6 shows a method 600 for determining impact characteristics of a ball with a ball striking element according to an exemplary embodiment of the present invention. In FIG. 6, the preferred steps of the invention are shown. A more detailed description of each of the steps in FIG. 6 is presented in the following.

In step 605, the processor 101 receives a sequence of images from the imager 108 at a given frame rate. The sequence of images depicts an object and an object striking element, e.g., a sports ball and a ball striking element, in this example, a golf ball and golf club. The frame rate at which the imager 108 captures frames is dependent on the imager used and may be configurable. Any imager 108 may be used that has a frame rate sufficiently high to capture multiple frames of a golf swing before and after impact. In an exemplary embodiment, the images are captured within a predetermined time span of the impact. For example, the frames may be captured from a time 50 ms prior to the impact to a time 50 ms after the impact. Preferably, the frames may be captured from a time 25 ms prior to the impact to a time 25 ms after the impact In step 610, fix points and fix lines are identified in the sequence of frames. The identification of fix points and fix lines in the images may be done in many different ways. In a first example, the processor 101 may first detect movement in an image, relative to adjacent frames, by subtracting an estimated background image from the current frame to generate a "motion image." Various smoothing and filtering may be performed on the motion image to make the motion detection as robust and accurate as possible. The detected movement in the images will typically correspond to the ball striking element, the player swinging the ball striking element, and the ball. In some applications, e.g. in golf, the ball will only move post-impact. The motion images may also be constructed using various foreground vs. background detection techniques such as MOG or MOG2. From the motion image, one can use different computer vision techniques, such as a Canny edge detector or Hough transform, to determine an outline of the ball striking element, and from there identify the fix points and fix lines by comparing the outline of the ball striking element with a predetermined set of existing ball striking elements with fix points. Other techniques may also be used, such as a machine learning approach using a neural network. The neural network may be trained by human annotations of fix points and fix lines in a high number of images from a test set of images. This trained neural network is then implemented on the apparatus 102 so it is capable of determining fix points and fix lines in any future images where fix points are present. A combination of the two afore-mentioned methods may be used, as well as other methods for detecting objects in images.

Only a single fix point determination for each frame may be used to element the exemplary embodiments, but a determination of multiple fix points and/or fix lines for each frame is preferable. By adding more fix points/lines, the system may be enabled to more consistently determine the locations of multiple fix points, relative to one another, in each frame, making the system more accurate and robust and enabling the system to identify and reject false and questionable fix point determinations and more accurately and continuously track the ball striking element. In addition, a determination of fix lines, such as the shaft angle of a golf club, may also be used to make a more accurate transformation of the impact characteristics, e.g., impact location, into a coordinate system of the golf club head. The fix point(s) and/or fix line(s) are determined in at least two frames from just prior to impact with the ball. Higher accuracy and robustness are generally experienced when using more frames both before and after impact.

In step 615, an impact time of the ball and the ball striking element is determined. As the contact time between the ball striking element and the ball is generally very short (e.g., approximately 0.5 ms for a golf club and a golf ball), the impact time will generally happen between two frames of the imager. The exact definition of the impact time, whether it is considered a moment of first contact between the ball striking element and the ball, a moment in the middle of the contact time, a moment of maximum compression of the ball, or a moment of separation between the ball striking element and the ball, may vary for the differently described embodiments. However, due to the short time during which the sports ball striking element and the ball remain in contact, for the remainder of this description, it will be assumed that the collision happens during an infinitely small time interval for ease of explanation of the general principles of the invention.

The determination of the time of impact of the ball and the ball striking element, relative to the timing of the received frames showing the ball striking element movement, may be done in many different ways. A preferred embodiment for detecting the impact time comprises detecting the ball in the images. If the ball is at rest prior to impact, such as in golf, the ball may be detected in only one frame prior to impact and in two frames after impact. By correlating these minimum three determined positions of the ball in the images one can determine the time of impact at a sub-frame level. This can be done by simple linear interpolation by determining the distance in the image between 110(*t*1) and 110(*t*2), determining the distance in the image from 110(10) to 110(*t*1), assuming a constant velocity in the image of the ball 110 after impact one can calculate the impact time t0. The same approach may be used if the ball is moving prior to impact, however, the ball may be detected in a minimum of two frames prior to impact, in addition to the two frames after impact.

Another embodiment for determining the time of impact is to determine the deceleration and/or change in direction of the ball striking element, as shown in FIGS. 8A and 8B. The loss in energy of the ball striking element is a result of the energy transferred to the ball during the collision and, consequently, happens more or less instantaneously. The deceleration or change in direction of the ball striking element may be detected by measuring the discontinuity of the linear or angular velocity of the fix points and lines. This method may utilize a detection of the ball striking element in at least two frames prior to impact and at least two frames after impact to be used. The measured discontinuity in velocity may be clearly visible when looking at any type of velocity as a function of time, as shown in FIG. 8B, but this method may require a high time resolution in the velocity determinations. Alternatively, the positions or angles may be evaluated over time and a time of impact determined as the intersection of the path before impact and the path after impact, as illustrated in FIG. 8A.

Yet another method for determining the time of impact is to combine the image detection with a radar sensor as part of the system. A Doppler radar has very high sensitivity, for detecting changes in speed, and a very high sample frequency. The detection of the change in speed in both the ball striking element and the ball may be highly accurate in time. The frames of the imager and the radar signal may be time synchronized for performing this method. Alternatively, a microphone may be used as an additional sensor to the imager. Collisions between a ball striking element and a ball are typically associated with a sharp short-term audio signature that can be accurately positioned in time. Similar to the radar method, the frames of the imager and the microphone signal may be time synchronized for performing this method. Many different approaches for achieving time synchronization exist, including either hardware or software solutions.

As those skilled in the art will understand, the alternative methods described above for determining the time of impact of the ball striking element and the ball may be combined in any suitable manner.

In step 620, the position and direction of the fix points and lines are determined at the time of impact. Multiple frames with fix points/lines have previously been determined in 610, and in 620 a smoothing is performed, first to increase the accuracy of the fix points/lines determination and, further, to determine both the estimated fix point(s) position at the determined time of impact and the 3D tangential direction of the fix point(s) and ball striking element at the time immediately before impact. The smoothing may be, e.g., a polynomial fitting. The smoothing may also be a physical model that approximates the expected movement of the ball striking element as, e.g., a 3D circle or ellipsis, and may use velocity data of the ball striking element from a radar. Using the determined time of impact and the smoothed positions over time of the fix point(s)/line(s), the position and direction of the fix point(s)/line(s) may be determined accurately at the time of impact, even if no image is actually available at the exact time of impact. As described in further detail below, the position and direction of the fix point(s)/line(s) of a golf club may be used to determine an attack angle and a club path at the time of impact. The attack angle may be defined as the vertical direction of the club head just prior to impact measured relative to the horizon while the club path may be defined as the horizontal direction of the club head just prior to impact measured relative to a reference line, such as a target line from a current location of the ball to a target. For example, the club path and the attack angle just prior to impact may be determined by a linear interpolation of the club positions shown in two or more images taken within a time period surrounding the impact that is selected so that no significant change in club path or attack angle is expected to occur. That is, for short period before and after impact, the path of the club and attack will not vary significantly and the state of the club at impact can be determined based on interpolation from positions in: 1) two images taken immediately prior to impact; or 2) two images taken immediately after impact; or 3) one image taken immediately prior to impact and one image taken immediately after impact. This time frame may be from 50 milliseconds prior to impact to 50 milliseconds after impact or, more preferably, from 25 milliseconds prior to impact to 25 milliseconds after impact. Thus, the club path and the attack angle just prior to impact may be determined by a linear interpolation of the club positions shown in any two images taken during this time frame. However, these club path and attack angles have so far been determined only in the image plane. To determine the three-dimensional club direction of the club head, i.e. the 3D version of club path and attack angle, it is necessary to determine the change of range to the club head from the imager during the time frame. The change of range to the club head from the imager can be determined either by determining the fix point in a third frame from the imager, or by determining the change of range (radial velocity) from a radar during the time frame where the position of the radar relative to the imager is known. In case of using frames after impact for the attack angle and club path determination, one may take into account the small deflection happening of the club head as a result of the collision in order to satisfy the law of physics regarding conservation of linear and angular momentum.

In step 625, the ball position at the time of impact is determined. This step may be optional and executed only when an impact location of the ball on the ball striking element is desired. In situations where the ball is at rest prior to impact, such as, e.g., in the application of golf, this step is performed simply by detecting the location of the ball in any image prior to impact. In a preferred embodiment, when the imager is positioned behind the intended target direction of launching the golf ball, the ball may be occluded by the golf club in the images taken closely prior to impact. However, any previous image may be used to determine the ball location in the image prior to impact. Considering the time duration of the back swing and of the forward swing are known within some ranges, in view of the previous steps of the method 600, it is typically easy to determine a point in time prior to impact when there is a clear line of sight to the ball at rest from the imager prior to impact.

In situations where the ball is moving prior to impact, it is preferred to first use the preferred method described above for determining the time of impact of the ball and the ball striking element in 615. As described above, by correlating the positions of the ball in images prior to and post-impact, the time of impact may be determined. The determined time of impact, correlated with a path of the ball in two images prior to impact or two images post-impact, allows for a determination of the ball position at the time of impact, even when the ball is not visible in an image at the time of impact and/or when an image does not exist at the time of impact. It may be advantageous to apply smoothing to the detected ball positions to increase the accuracy of the ball position determination at impact.

In step 630, a distance to the ball from the imager is determined at the time of impact. Detection of positions in images is in general an angular measurement. The distance determination may inform a determination of final coordinates for the impact characteristics of the ball striking element. The distance determination may be performed in at least the following ways.

In a first embodiment, the distance to the ball from the imager at the time of impact may be predetermined. In, for example, golf, baseball or cricket, the area where the ball is located at impact is typically fairly small. Thus, with only a small margin of error, one may assume the distance to the ball at impact to be a certain distance determined based on where the imager is located relative to the tee area in golf, the home plate in baseball, and the wicket in cricket.

In a second embodiment, the distance to the ball from the imager at the time of impact may be determined by first determining a size of the ball in the images and correlating the size (in pixels) with the known dimensions of the sports ball. In a related third embodiment, the distance to the ball from the imager at the time of impact is determined by correlating the distance in the image between the detected fix points and fix lines with known dimensions of the ball striking element. For example, the size of golf club heads is generally relatively standardized, as is the length of baseball bats and cricket bats.

In a fourth embodiment, the distance to the ball from the imager at the time of impact may be determined by including another sensor, such as a radar, in the system. The other sensor may be independently capable of determining the distance to the ball and/or ball striking element. For example, including a Doppler radar in the imager system may provide the further benefit that the range/distance and range rate/velocity of both the ball and the ball striking element may be accurately measured at any point in time. This will generally increase the accuracy of the three-dimensional impact characteristics derived from the present invention. By including a Doppler radar as part of the system, one can in general combine the imager based measurements with the radar measurements if, for example, the Doppler radar is capable of detecting the ball and golf club impact, this can be used to reduce the number of frames to be analyzed and further define a region of each of the images in which either the ball or golf club is expected to be located. This approach greatly reduces the computational effort needed for the image detections.

Figure 7B:
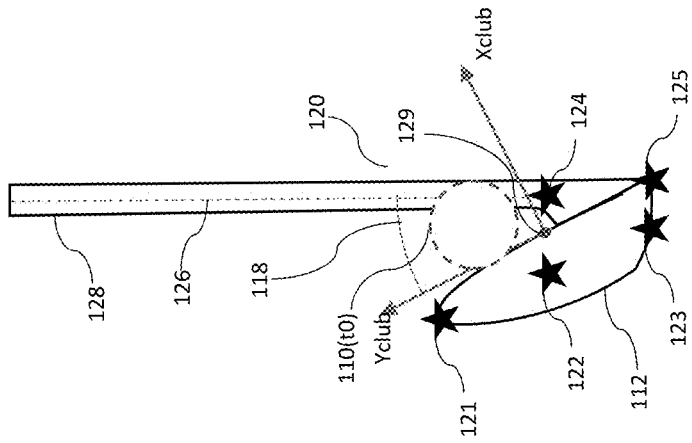
FIGS. 7A and 7B show views of a golf club coordinate system according to an exemplary embodiment of the present invention.
Figure 7A:
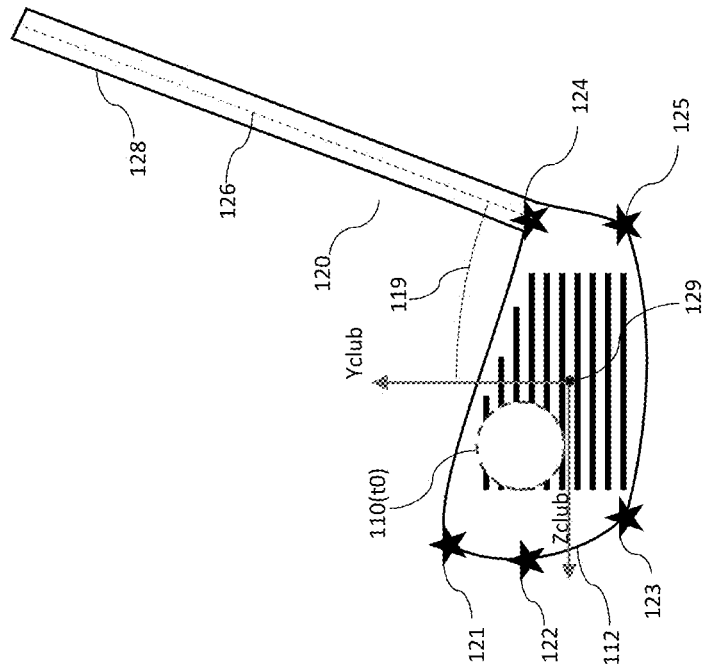

In step 635, the impact characteristics are determined. The impact characteristics may be determined in a coordinate system defined by the imager. However, in many instances, it will be desirable to present some or all of the impact characteristics in a more meaningful coordinate system. In FIGS. 7A and 7B, for example, a golf club coordinate system is shown relative to the positions of the fix points 121-125 and the fix line 126 of the golf club. An origin 129 of the golf club coordinate system may be located in the center of the face 120 of the golf club, with an X-axis projecting out from the club face in a direction perpendicular to the face at the origin, a Y-axis projecting in a first direction parallel to the face at the origin, and a Z-axis projecting in a second direction parallel to the face at the origin, as shown. A typical definition of the center of an iron-type golf club is the middle of the fifth or sixth groove line from the bottom of the club. For other golf clubs, such as woods and drivers, the center of the club face is typically indicated by markings on the club face. The location of the center of the club face may be assumed relative to one or more of the fix points and/or fix lines detected on the golf club, or may be predetermined. Alternatively, the center of the club face may be directly estimated based on the locations of the fix points and/or fix lines. For example, it may be valid to assume that the club face center is located midway between the heel and the toe of the golf club or a percentage offset from this location.

The orientation of a golf club face coordinate system can be described by two angles, the lie 119 of the club and the loft 118 of the club. The lie 119 and the loft 118 may either be assumed, predetermined or determined from the detected fix points and fix lines. Golf clubs of a similar type, such as a 6 iron or a driver or wedge, will generally have very similar offsets and lie/loft angles, and so in many cases the user may simply indicate which type of club he/she is using for a sufficiently accurate estimation of the lie and loft angles. Once the offset and orientation of the club face are known relative to the fix points and/or fix lines, the impact characteristics may be coordinate transformed into the golf club coordinate system.

For other impact characteristics of a golf club, including, for example, a club path, an attack angle, a dynamic loft, a face angle and a dynamic lie, a meaningful coordinate system may be a coordinate system with the origin being the ball location prior to impact. A first axis of the coordinate system may be the intended target direction and a second axis of the coordinate system may be parallel with the plumb line, with a third axis completing the cartesian coordinate system. For determining the three-dimensional direction of the golf club at the point of impact, one may first decide a reference point, i.e., which part of the golf club these parameters are to be determined for. For example, the club path at the heel of the golf club is not the same as the club path at the toe of the golf club. In most cases, the center of the club face is selected as the reference point for determining the direction of the golf club. In other cases, either the geometric center of the club head or the center of mass of the club head is selected as the reference point. To determine the movement of the selected reference point, a geometric model of the golf club may be used that is matched as best as possible with the determined fix point(s)/line(s) of the golf club. The movement determination is then made with respect to one or more of the determined fix point(s)/line(s) over time.

The attack angle may be defined as the vertical direction of the club head just prior to impact measured relative to the horizon. The club path may be defined as the horizontal direction of the club head just prior to impact measured relative to the target line. The dynamic loft may be defined as the vertical angle of the club face normal (90 degrees to the club face) at either the center of the club face or at the impact location point on the club face at time of impact, measured relative to the horizon, i.e., the amount of loft on the club face at impact. Similarly, the face angle may be defined as the club face normal (90 degrees to the club face) at either the center of the club face or at the impact location point on the club face at time of impact, measured relative to the target line. The dynamic lie may be defined as the angle of the shaft, in the shaft end connected to the club head, relative to the plumb line.

In step 640, the impact characteristics of the ball striking element are output to the display of the apparatus 102. In a further exemplary embodiment, the display may be a computer screen, a smart phone screen, or a tablet screen. The impact characteristics may be used to enhance a broadcast of sporting events. For example, when the ball striking element is a golf club, the impact characteristics of a golf shot may be displayed during a broadcast of a golf tournament. In a second example, when the ball striking element is a baseball bat, the impact characteristics of a baseball swing may be displayed during a broadcast of a baseball game.

Similar modeling may be used for other types of ball striking elements. In other sports, such as baseball, the impact location would preferably be presented in a coordinate system with an axis identical to the rotational symmetry axis of the bat and an origin at the tip of the bat. However, for other impact characteristics like the three-dimensional direction (swing path and attack angle) and the two-dimensional orientation of the bat at impact (barrel angle and bearing (the bat is rotationally symmetric)), the preferred coordinate system is likely the playing field or a coordinate system aligned with the incoming ball.

For racket sports, such as tennis, the impact location is preferred in a coordinate system of the racket, whereas the three-dimensional direction and three-dimensional orientation is preferred in a coordinate system of the playing field or relative to the incoming ball.

In addition to determining the various impact characteristics of the ball striking element, the system may also provide launch data on the ball, like ball speed, launch angle and launch direction. These data can be easily derived from the determined ball position in the images combined with the determined distance to the ball at impact. The determination of the ball launch data can include fitting an aerodynamical model to the determined angular positions of the ball to provide a more robust and accurate estimation. Optionally, the system may include a radar. Including a Doppler radar to the imager system has the further benefit that the range and range rate may be accurately measured at any point in time of the ball. This will in general increase the accuracy of the launch data of the ball. In situations where the ball is moving prior to impact, obviously similar impact data may be determined on the incoming ball in a similar manner. This would provide data points on the ball such as approach speed, approach angle and approach direction.

Correlating the impact characteristics of the ball striking element with the ball approach and launch data provides a very detailed measurement of the collision of the ball striking element and the ball which has many valuable applications.

Figure 9B:
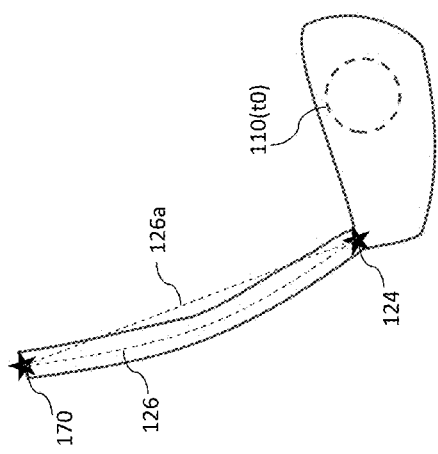
FIGS. 9A and 9B show rear views of a golf club impacting a golf ball where a deflection of a shaft of the golf club is detected according to an exemplary embodiment of the present invention.
Figure 9A:
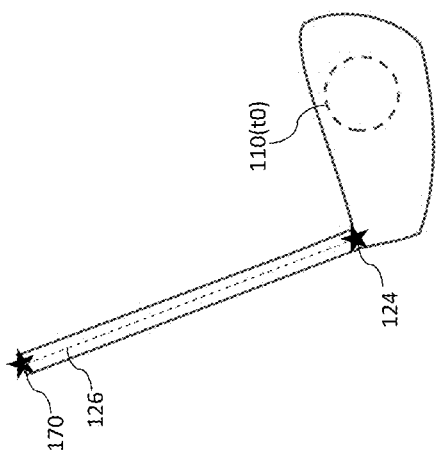

FIGS. 9A and 9B show rear views of a golf club impacting a golf ball where a deflection of a shaft of the golf club is detected according to an exemplary embodiment of the present invention. By detecting the shaft fix line 126 and comparing it to a straight line 126a, the amount of flexing of the shaft can be determined. Additional fix points like 170 can be detected towards the grip end of the golf club, in addition to fix point 124 on the hosel of the golf club. The additional fix point 170 may be used together with the shaft fix line 126 to detect a flexing of the shaft or a change relative to the initial shape, positioning and orientation of the club head, shaft and grip relative to one another. For example, the three-dimensional position of the grip and the club head relative to one another may be detected before a player begins a swing to establish a resting geometry of the club. Then as a swing progresses, the system can monitor the fix points 170, 124 and the fix line 126 to detect and measure movement of the club head relative to the grip (i.e., any movement that changes a distance from the club head to the grip) that indicates an amount of flexing of the shaft throughout the swing. This information may then be provided to the player in any desired format, like a drop angle or amount of movement of the club head from a non-flexed situation.

In a case where the golf club hits the ground during the swing before or during contact with the ball, such as during a golf shot off the grass, the golf club head will experience a force from the ground pushing the club head upward, leading to a change in flexing of the golf shaft. In a case where a ball is hit from a golf tee, in general, the club head will be deflected downwards due to the oblique impact between the golf club and the golf ball. In addition, a flexing of the shaft may be detected throughout the swing. The club will generally experience a maximum amount of flexing at the peak of the backswing or just prior or post impact with the ball, and the flex may be harnessed by the golfer to provide additional power when striking the ball during the forward swing. In some cases, the golf club might impact the ground before impacting the ball—a so called 'fat shot'—which deaccelerates the club head and may also change the orientation and direction of the club head. By detecting the shaft flexing and/or club head movement characteristics by using the invention disclosed here, it will be possible to detect and inform the golfer whether a shot was 'fat' or not and thereby give reasons for different shot outcomes as compared to a scenario in which the club head not impacted the ground before impacting the ball.

The detection of these changes of shaft flexing as well as the absolute amount of flexing is important for optimizing shaft flexing profiles for individual golfers, development of new golf shafts, as well as give more relevant measurement parameters for the collision between the golf club and the ball. Obviously similar flexing characteristics can be experienced with other ball striking elements, like hockey sticks, tennis rackets, baseball bat etc.

What is claimed is:

1. A method, comprising:
    identifying a first line on an object striking element in at least a first image and a second image from a sequence of images received from an imager, wherein the first and second images are captured within a predetermined time span of an impact of an object with the object striking element;
    determining an impact time of the impact of the object with the object striking element; and
    determining an angle of the first line at the impact time.

2. The method of claim 1, further comprising comparing the first line with known geometric properties of the object striking element to determine the three-dimensional angle of the first line at the impact time.

3. The method of claim 2, further comprising:
    when the object striking element is a golf club comprising a club face and the first line is an axis of a shaft of the golf club, determining an orientation of the club face during the predetermined time span; and
    determining based on the axis and a known angular relationship between the club face and the club shaft, a three-dimensional orientation of the club shaft at the impact time.

4. The method of claim 1, further comprising:
    determining a deflection of the first line, with respect to known geometric properties of the object striking element, in at least one of the first and second images; and
    determining a flexing of the object striking element during the predetermined time span.

5. The method of claim 2, further comprising:
    determining a deviation, with respect to the known geometric properties of the object striking element, of the first line in the first and second images; and
    determining whether the object striking element contacted a ground surface based on the determined deviation.

6. The method of claim 4, further comprising determining when the object striking element contacted with a ground surface occurred relative to the impact time.

7. The method of claim 4, further comprising displaying data corresponding to the flexing of the object striking element.

8. The method of claim 7, wherein the object striking element is one of a club, racket, bat, paddle, stick and foot.

9. The method of claim 1, wherein, when the object is stationary prior to impact, a position of the object at the impact time is predetermined.

10. The method of claim 1, wherein, when the object is stationary prior to impact, a distance from the object to the imager at the impact time is determined based on a size of the object in an image captured prior to the impact time.

11. The method of claim 1, further comprising converting an imager coordinate system to a coordinate system from a perspective of an object striking element surface of the object striking element.

12. The method of claim 1, further comprising displaying data corresponding to an impact location of the object on the object striking element at the impact time.

13. The method of claim 1, wherein the first and second images are captured immediately prior to the impact of the object with the object striking element.

14. The method of claim 1, wherein the first and second images are captured immediately after the impact of the object with the object striking element.

15. The method of claim 1, wherein the first image is captured immediately prior to the impact of the object with the object striking element and the second image is captured immediately after the impact.

16. The method of claim 1, further comprising:
    synchronizing the imager with a microphone; and
    receiving, via the microphone, a microphone signal during the predetermined time span, wherein the predetermined time span includes the impact time;
    wherein the impact time is determined based on a sound of the impact detected in the microphone signal.

17. The method of claim 1, further comprising:
    synchronizing the imager with a radar; and
    receiving from radar data indicating a velocity of at least one of the object striking element and the object during the predetermined time span, wherein the impact time is determined based on a timing of a discontinuity in the velocity of the one of the object striking element and the object over the predetermined time span.

18. A system, comprising:
    an imager configured to capture a sequence of images, wherein at least a first image and a second image are captured within a predetermined time span of an impact of an object with a surface of an object striking element surface; and
    a processor configured to:
        identify a first line on the object striking element in at least the first image and the second image;
        determine an impact time of the impact of the object with the object striking element; and
        determine an angle of the first line at the impact time.

19. The system of claim 18, further comprising:
    a microphone synchronized with the imager, the microphone sending a microphone signal to the processor during the predetermined time span, wherein the predetermined time span includes the impact time and wherein the impact time is determined based on a sound of the impact detected in the microphone signal.

20. The system of claim 18, further comprising:
    a radar synchronized with the imager and capable of sending data to the processor, the data indicating a velocity of at least one of the object striking element and the object during the predetermined time span, wherein the impact time is determined based on a timing of a discontinuity in the velocity of the one of the object striking element and the object over the predetermined time span.

* * * * *

UNITED STATES PATENT AND TRADEMARK OFFICE
CERTIFICATE OF CORRECTION

PATENT NO. : 11,612,801 B2
APPLICATION NO. : 17/249062
DATED : March 28, 2023
INVENTOR(S) : Tuxen It is certified that error appears in the above-identified patent and that said Letters Patent is hereby corrected as shown below:

In the Claims

Claim 18, Column 14, Lines 41-42:
"of an object with a surface of an object striking element surface; and" should read "of an object with a surface of an object striking element; and".

Signed and Sealed this
Ninth Day of May, 2023

Katherine Kelly Vidal
*Director of the United States Patent and Trademark Office*